Sept. 4, 1956     A. P. FERGUESON ET AL     2,761,697
FENDER AND FENDER SHIELD ASSEMBLY
Filed July 30, 1952     3 Sheets-Sheet 1
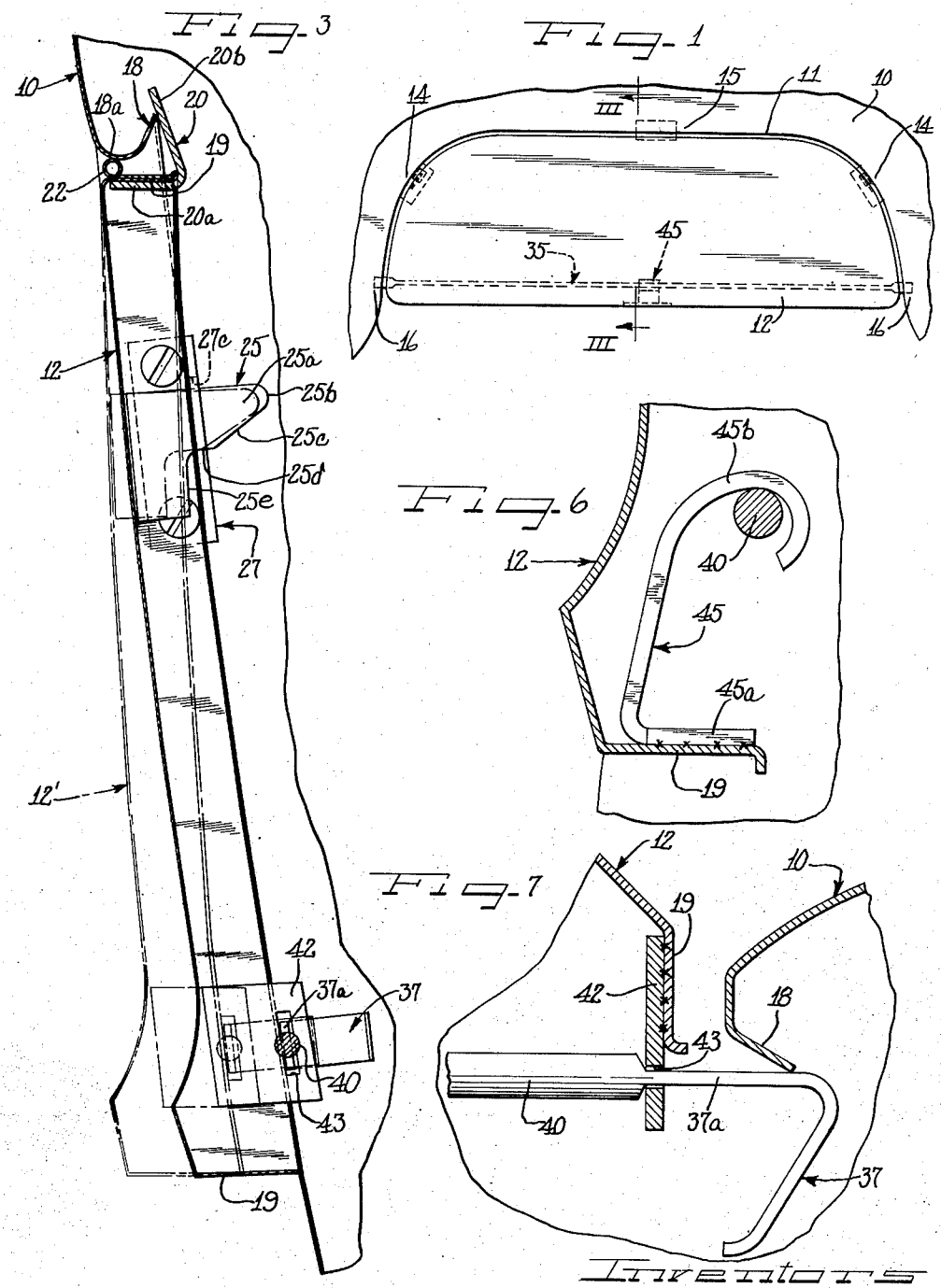
Inventors
Arthur P. Fergueson
George W. Schatzman Sept. 4, 1956  A. P. FERGUESON ET AL  2,761,697
FENDER AND FENDER SHIELD ASSEMBLY
Filed July 30, 1952  3 Sheets-Sheet 2
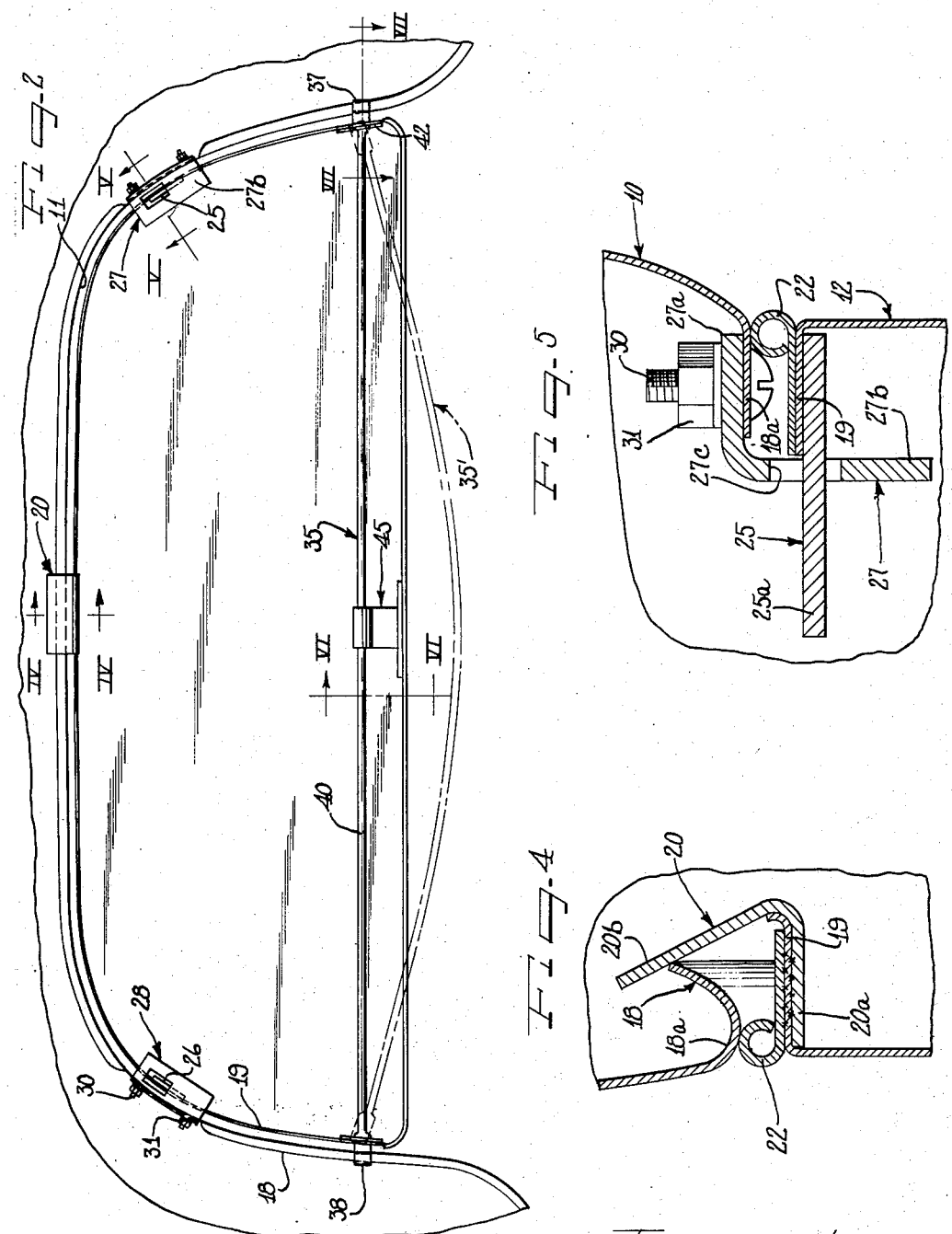
Inventors
Arthur P. Fergueson
George W. Schatzman Sept. 4, 1956 A. P. FERGUESON ET AL 2,761,697
FENDER AND FENDER SHIELD ASSEMBLY
Filed July 30, 1952 3 Sheets-Sheet 3
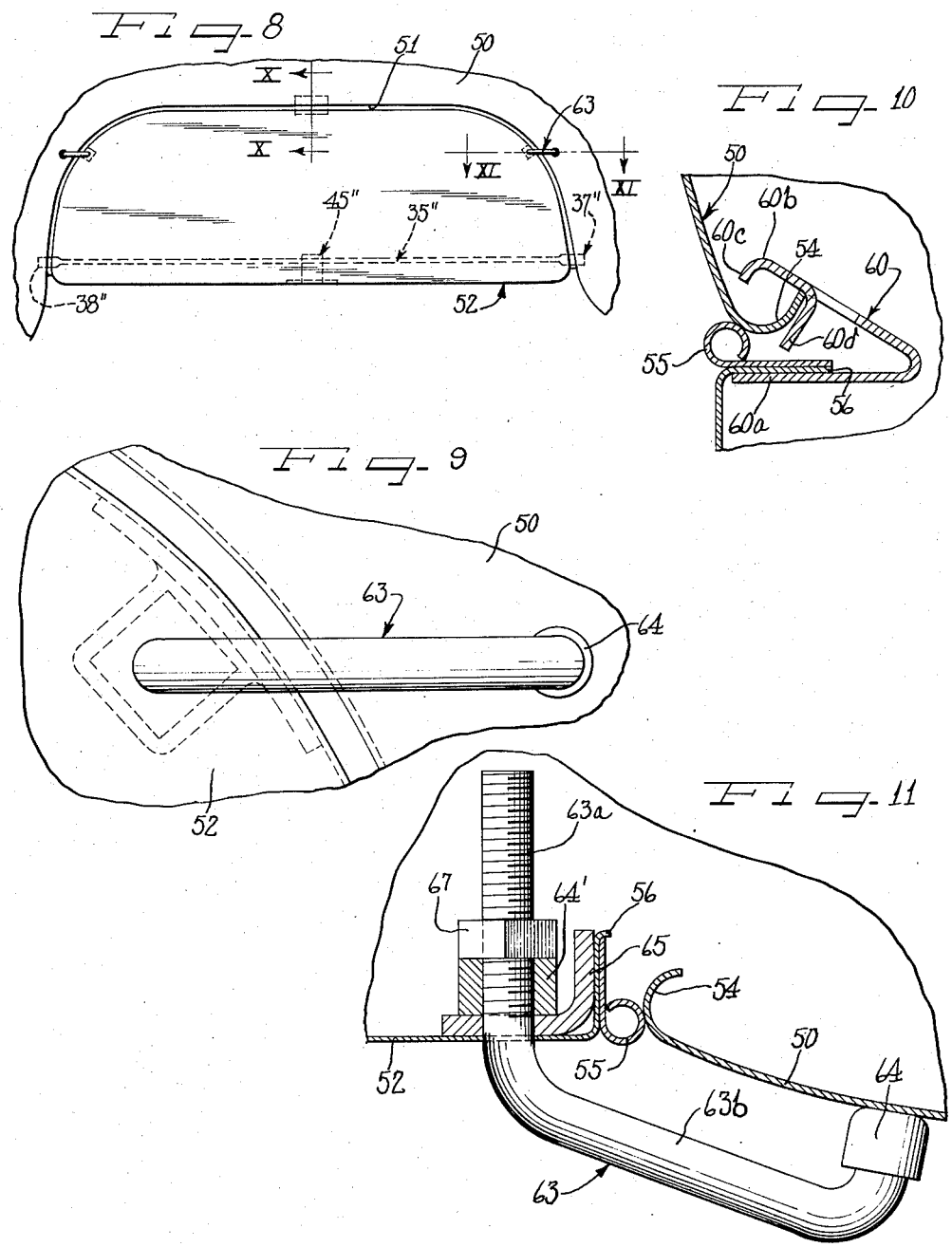
Inventors
Arthur P. Fergueson
George W. Schatzman
Attys

United States Patent Office 2,761,697
Patented Sept. 4, 1956

2,761,697
FENDER AND FENDER SHIELD ASSEMBLY

Arthur P. Fergueson and George W. Schatzman, Detroit, Mich., assignors to Houdaille Industries, Inc., Detroit, Mich., a corporation of Michigan Application July 30, 1952, Serial No. 301,652

20 Claims. (Cl. 280—153)

This invention relates to improvements in fender shields and more particularly concerned are improvements in the mounting of a fender skirt or shield on a fender.

In the vehicle industry, and particularly in the automobile industry, various means have been utilized to improve the appearance of vehicle fenders. The usual vehicle fender is provided with an opening affording access to the vehicle wheel and permitting ready removal or replacement of the wheel in an axial direction. Since this opening inherently presents an unattractive outward appearance, detachable fender shields have been employed to cover the opening ornamentally.

As the term "fender shield" shall hereinafter be employed, it refers to any member which is adapted to be secured to a fender or other portion of a vehicle body for the purpose of covering the opening in the fender or vehicle body provided for access to or removal of a vehicle wheel. Furthermore, as the term "fender" shall hereinafter be employed, it refers to any form of wheel fender in its broad sense, whether such fender be separated from the vehicle body, partly separated from the vehicle body, or actually an integral part of the vehicle body, and whether or not it projects outwardly from the principal body portion of the vehicle.

An important object of the present invention is to provide an improved fender and fender shield assembly in which the fender shield is detachably secured to the fender in a novel manner.

Another object of the invention is to provide a fender shield having improved means for attaching the fender shield to a fender.

A further object of the invention is to provide an improved fender shield construction of the type which is applied to the fender by inward pivoting of the fender shield about an engagement with the fender at the upper margin of the fender shield.

A still further object of the invention is to provide improved attaching means for attaching a fender shield of the type which is applied by inward movement of the lower portion of the fender shield with the upper portion of the fender shield engaging the fender.

Still another object of the invention is to provide improved means for interlocking a fender shield with the fender of a vehicle.

Other objects, features and advantages of the present invention will be readily apparent from the following detailed description of certain embodiments thereof, taken in conjunction with the accompanying drawings, in which:

Figure 1 is a fragmentary side elevational view of the outer side of a vehicle fender and fender shield assembly embodying features of the present invention;

Figure 2 is a fragmentary side elevational view of the inner side of a vehicle fender and fender shield assembly embodying features of the present invention;

Figure 3 is an enlarged fragmentary sectional view taken substantially along the line III—III of Figure 1 and showing the movement of the fender shield in the final interengaging of the fender shield with the fender;

Figure 4 is an enlarged fragmentary sectional view taken substantially along the line IV—IV of Figure 2;

Figure 5 is an enlarged fragmentary sectional view taken substantially along the lines V—V of Figure 2;

Figure 6 is an enlarged fragmentary sectional view taken substantially along the lines VI—VI of Figure 2;

Figure 7 is a fragmentary sectional view taken substantially along the lines VII—VII of Figure 2 and showing the locking mechanism for engaging the inner edge of the fender inturned flange at the lower corner of the wheel opening;

Figure 8 is a fragmentary side elevational view of the inner side of a vehicle fender and fender shield assembly in accordance with a modified form of the present invention;

Figure 9 is an enlarged fragmentary side elevational view of a bracket for engaging the outer surface of a fender upon interlocking of the fender shield with the fender in accordance with the modified form of the invention;

Figure 10 is a fragmentary enlarged sectional view taken substantially along the lines X—X of Figure 8 and showing a bracket at the top of the fender shield for suspending the fender shield from the fender; and Figure 11 is a fragmentary enlarged sectional view taken substantially along the lines XI—XI of Figure 8.

In a typical assembly embodying the features of the present invention (Figure 1), a fender 10 has a wheel access opening 11 which is closed by a removable fender shield 12 comprising a panel formed from suitable sheet material. The arrangement and construction of the fender and fender shield are such that the lines of the outer surface of the fender shield are substantially a continuation of and blend with the lines of the outer surface of the fender. The fender shield provides a closure which as nearly as practicable appears in the final assembly as a part of the fender.

According to one form of the present invention, the fender shield 12 is so constructed and related to the fender 10 that the fender shield is adapted to be assembled with the fender by engaging the upper portion of the fender shield with the fender and then rocking the lower portion of the fender shield into the wheel access opening 11 for final latching with the fender. To this end, the fender shield has means coacting with the central upper portion 15 of the fender at the top central portion of the wheel opening 11 to define the position of the upper portion of the fender shield in one axial direction with respect to the fender; has further means cooperating with the intermediate margin portions 14 of the fender to define the position of the intermediate portion of the fender shield in the opposite axial direction with respect to the fender and in the present embodiment also for suspending the fender shield in assembly with the fender; and latching structure is carried at the inside of the fender shield at the lower portion thereof for latching engagement with the lower corner portions 16 of the fender to retain the fender shield in assembly with the fender.

The edge of the fender defining the wheel access opening 11 comprises an inwardly directed flange 18 (Figures 2, 4 and 7) of generally return bent curved cross-section. To engage behind the fender flange 18 at the top portion 15 of the fender, the inturned margin 19 of the fender shield has an angle bracket 20 with one leg 20a secured to the underside of the fender shield flange 19 and the other leg 20b extending angularly upwardly and outwardly to engage behind the fender flange 18. A bead member 22 is secured to the upper surface of the fender shield flange 19 to engage the curving portion 18a of the fender flange 18 to act as a seal between the fender and fender shield. The bracket 20 thus serves to prevent outward movement of the upper portion of the fender shield relative to the fender.

As seen in Figures 2 and 5, the means for preventing inward movement of the intermediate portion of the fender shield relative to the fender after assembly and also for supporting the fender shield with the fender comprises a pair of brackets 25 and 26 which cooperate with brackets 27 and 28 carried by outturned portions 18a of the fender flange 18. As seen in Figure 5, the bracket 27 has a leg 27a secured to the flange portion 18a by means of a bolt 30 and nut 31 and has a flange portion 27b projecting into the wheel access opening 11, the flange portion 27b having a slot 27c for receiving a nose portion 25a of the bracket 25. The bracket 25 is secured to the flange 19 of the fender shield 12 and has a rounded terminal portion 25b (Figure 3), a lower upwardly sloping cam portion 25c, and a generally horizontal support portion 25d.

It will thus be appreciated that after the top bracket 20 is interengaged with the fender flange 18 at the top of the wheel access opening, as the fender shield is pivoted into the position shown in solid outline in Figure 3 from the dot dash position shown at 12', the sloping cam face 25c of the nose portion 25a will engage the lower edge of the slot 27c to cam the fender shield upwardly against the top border of the fender. When the support portion 25d engages over the lower edge of the slot 27c, the fender shield is supported in assembled relation with the fender. The opposition of the bracket 27 to the lower generally vertical edge portion 25e of bracket 25 (Figure 3) and the fender shield flange 19 (Figure 5) then prevents inward movement of the intermediate portion of the fender shield 12.

During the pivoting of the fender shield into position, the lower latching assembly 35 is held in the position indicated in dot dash outline at 35' with its flexible actuating element 40 bowed so that the latching arms 37 and 38 are retracted inwardly toward the fender shield. The fender shield may thus be swung into the opening 11. As indicated in Figure 7, when the fender shield is in position, the flexible actuating element 40 is allowed to resume its normal straight orientation by virtue of its own resiliency and the latching arm 37 is projecting outwardly so that the portion 37a thereof engages behind the flange 18 of the fender 10. The portion 37a is slidably mounted by means of a plate 42 secured to the flange 19 of the fender shield by means of a slot 43 therein, Figures 3 and 7.

As indicated in Figure 6, on the lower margin 19 of the fender shield is mounted a bracket 45 having a base portion 45a secured to the flange 19 and having a hooked end portion 45b for receiving the flexible element 40 in straight assembled position.

The operation of installing or removing of the first illustrated form of fender shield will now be readily understood. The fender shield 12 is moved inwardly into the access opening 11 at an inclined angle so that the bracket 20 will engage behind the fender flange 18. The fender shield is then rocked downwardly into the wheel access opening 11 so that the nose portion 25a will engage in the opening 27c of the bracket 27. Further inward movement of the fender shield causes the fender shield to be cammed upwardly by virtue of the sloping cam surface 25c riding on the bottom of the slot 27c of the bracket 27. Finally the support portion 25d of the bracket 25 rides into the slot 27c to support the fender shield at the desired level in the access opening. During final downward rocking movement of the fender shield, the flexible latching element 40 is, of course, in its bowed position shown in dot-dash outline in Figure 2 so as to permit the arms 37 and 38 to pass behind the fender, the flexible element 40 then being released to project the latching arms 37 and 38 behind the fender flange 18. The flexible element 40 is next engaged with the hook bracket 45 and assembly is completed, the bracket 45 being preferably arranged so that element 40 will snap into engagement therewith upon release from bowed position. It will be understood that the bracket 25 may be fully seated in the bracket 27 prior to full engagement of the latching mechanism with the fender flange so that the desired wrap is imparted to the assembled fender shield.

For releasing and removing the fender shield assembly 12, the reverse action is effected.

In the second illustrated form of the invention shown in Figures 8 to 11, the flexible resilient latching mechanism is the same as that shown in Figure 2, but the means for retaining the upper portion of the fender shield against outward movement and the intermediate portion of the fender shield against inward movement are different. In this embodiment the fender 50 has a similar wheel access opening 51 for receiving the fender shield 52. The fender is provided with a marginal flange 54 which is similar to the flange 18 of Figure 4 and cooperates similarly with a bead member 55 carried by the fender shield flange 56. However, in this case the top bracket 60 is designed to support the fender shield in the vertical direction as well as to prevent outward movement of the fender shield at the top thereof. As seen in Figure 10, the bracket 60 includes a base portion 60a secured to the fender shield flange 56 and an upwardly sloping body portion 60b terminating in a downturned flange 60c. A lug 60d is struck out from an intermediate portion of the body 60b in spaced relation to the terminal flange 60c for opposing the fender flange 54 to prevent outward movement of the fender shield. Since the body 60b hooks over the flange 54 at a fairly flat angle, the bracket 60 is also effective to support the entire fender shield with the fender.

For retaining the intermediate portion of the fender shield against inward movement, a bracket 63 is provided which has a rubber cap 64 for engaging the fender adjacent the wheel access opening. The bracket includes a threaded portion 63a in engagement with a tapping plate 64' carried by an angle 65 which angle is secured to the fender shield at the margin thereof. A lock nut 67 serves to secure the bracket in any selected position. The bracket further includes an angularly extending arm portion 63b extending outwardly beyond the margin of the fender shield and into opposition to the outer side of the fender. It will be appreciated that the tension on the fender surface may be adjusted by loosening the lock nut 67 and screwing the bracket 63 in or out as desired.

In both forms of the invention, the fender shield mounting means may be constructed and arranged so as to require the desired amount of wrap of the fender shield in its finally assembled position. For example, the fender shield may be bowed outwardly slightly in the horizontal plane, and as indicated in Figure 3 may be bowed in a vertical plane about an intermediate point.

It is believed that the operation of installing or removing this form of fender shield will be readily understood. The fender shield 52 is moved inwardly into the access opening 51 at an inclined angle so that the terminal flange 60c, Figure 10, is hooked over the fender flange 54. The fender shield is then rocked downwardly into the wheel access opening 51, the flexible latching mechanism 35" being actuated to retract the latching arms 37" and 38" so that they may pass behind the fender, whereupon the latching mechanism is released and engaged under the hook 45" to allow the latching arms 37" and 38" to engage behind the fender flange 54 to retain the fender shield in assembled relation. It will be understood that the cap 64 of the bracket 63 may contact the outer side of the fender adjacent the wheel access opening prior to full engagement of the latching mechanism with the fender flange so that the desired wrap is imparted to the assembled fender shield.

For releasing and removing the fender shield assembly 52, the reverse action is effected.

It will be understood that modifications and variations

We claim as our invention:

1. In combination in a fender and fender shield assembly, a fender having a wheel access opening and a fender shield for closing said opening, the fender shield having a bracket at the top portion thereof for engaging with said fender, bracket means engaging said fender and the intermediate portion of said fender shield to retain said fender shield intermediate portion against inward movement relative to said fender, bearing brackets mounted at the opposite lower corner portions of said fender shield, latching arms laterally slidably mounted in said bearing brackets for retraction toward said fender shield and projection laterally outwardly beyond said fender shield, and a resilient elongated element connecting said latching arms, bowing of said flexible element being effective to retract said latching arms, and straightening of said flexible element being effective to project said latching arms for releasably engaging said fender to retain said fender shield in assembled closing relation with said fender access opening, said intermediate bracket means comprising a bracket carried by said fender flange and having a recessed portion projecting into said wheel access opening, and a further bracket carried by said fender shield having a portion for projecting into said recessed portion, said first mentioned bracket means carried by said fender flange opposing said fender shield to limit inward movement of the fender shield relative to the fender.

2. In combination in a fender and fender shield assembly, a fender having a wheel access opening and a fender shield for closing said opening, the fender shield having a bracket at the top margin thereof for engaging said fender to retain the fender shield upper portion against outward movement relative to the fender, means for retaining the fender shield intermediate portion against inward movement relative to the fender, and latching means carried by the lower portion of the fender shield including a flexible latching element extending along the lower margin of the fender shield and a pair of latching arms at opposite ends of the fender shield connected with said flexible elements for retraction toward said fender shield upon bowing of said flexible element and for projection outwardly laterally of said fender shield upon release of said flexible element to engage said fender to retain the fender shield in closing relationship to the wheel access opening, said retaining means for the intermediate portion of said fender shield including a bracket carried by said fender and projecting into said wheel access opening, and a bracket carried by said fender shield for cooperating with said fender bracket to limit inward movement of said fender shield and to support said fender shield with said fender.

3. In combination in a fender and fender shield assembly, a fender having a wheel access opening and a fender shield for closing said opening, the fender shield having a bracket at the top portion thereof for engaging with the fender, bracket means for connecting an intermediate portion of said fender shield at the opposite ends thereof with said fender to retain said fender shield against inward movement relative to said fender, bearing brackets mounted at the opposite lower corner portions of said fender shield, latching arms laterally slidably mounted in said bearing brackets for retraction toward said fender shield and projection laterally outwardly beyond said fender shield, and a resilient elongated element connecting said latching arms, bowing of said flexible element being effective to retract said latching arms, and straightening of said flexible element being effective to project said latching arms for releasably engaging the fender to retain said fender shield in assembled closing relation with said fender access opening, said intermediate bracket means comprising an arm extending laterally from said fender shield for engagement with the outer side of said fender adjacent said wheel access opening.

4. In combination in a fender and fender shield assembly, a fender having a wheel access opening and a fender shield for closing said opening, the fender shield having a bracket at the top margin thereof for engaging said fender to retain the fender shield upper portion against outward movement relative to the fender, means carried at the intermediate portion of the fender shield at opposite ends thereof for retaining the fender shield against inward movement relative to the fender, and latching means carried by the lower portion of the fender shield including a flexible latching element extending along the lower margin of the fender shield and a pair of latching arms at opposite ends of the fender shield connected with said flexible elements for retraction toward said fender shield upon bowing of said flexible element and for projection outwardly laterally of said fender shield upon release of said flexible element to engage said fender to retain the fender shield in closing relationship to the wheel access opening, said intermediate means engaging said fender on the outer side thereof adjacent said wheel access opening.

5. In a fender shield assembly, a fender shield having a bracket at the top margin thereof for engaging the upper portion of the fender shield with a fender, a pair of brackets at an intermediate portion of the fender shield at the opposite ends thereof for retaining an intermediate portion of the fender shield with a fender, a pair of laterally projectable latching arms mounted adjacent the lower portion of said fender shield for engaging the fender in assembled relation of the fender shield with the fender, and a flexible latching element connected with said latching arm and operable to retract said latching arms upon flexing of said element, said top bracket including means for suspending said fender shield with said fender, and said intermediate brackets including arm portions extending outwardly from said fender shield for engaging the outer side of the fender to retain the fender shield against inward movement relative to the fender.

6. In combination in a fender and fender shield assembly, a fender having a wheel access opening and a fender shield for substantially closing said opening, the fender shield having means at the top portion thereof for engaging with said fender, means engaging said fender and the intermediate portion of said fender shield to retain said fender shield intermediate portion against inward movement relative to said fender, said intermediate means comprising a fender bracket carried by said fender and having a recessed portion projecting into said wheel access opening and a further bracket carried by said fender shield having a portion for projecting into said recessed portion, said fender bracket opposing said fender shield to limit inward movement of the fender shield relative to the fender, and means operatively connected to the fender and fender shield for latching the lower portion of said fender shield to the fender to retain the fender shield in assembled closing relation with the fender access opening.

7. In combination in a fender and fender shield assembly, a fender having a wheel access opening and a fender shield for substantially closing said opening, the fender shield having means at the top thereof for engaging said fender to retain the fender shield upper portion against outward movement relative to the fender, means for retaining the fender shield intermediate portion against inward movement relative to the fender, and latching means carried by the lower portion of the fender shield to retain the fender shield in closing relationship to the wheel access opening, said retaining means for the intermediate portion of said fender shield including a fender bracket carried by said fender and projecting into said wheel access opening, and a bracket carried by said fender shield for cooperating with said fender bracket to limit inward movement of said fender shield and to support said fender shield with said fender.

8. In combination in a fender and fender shield assembly, a fender having a wheel access opening and a fender shield for closing said opening, the fender shield having means at the top portion thereof for engaging with the fender, means for connecting an intermediate portion of the fender shield at the opposite ends thereof with said fender to retain said fender shield against inward movement relative to said fender, said intermediate means comprising an arm extending laterally from said fender shield for engagement with the outer side of said fender adjacent said wheel access opening, and means carried by said fender shield at the lower portion thereof for releasably engaging the fender to retain said fender shield in assembled closing relation with said fender access opening.

9. In combination in a fender and fender shield assembly, a fender having a margin defining a wheel access opening and a fender shield for closing said opening and having its outer peripheral margin of configuration to be slightly spaced radially inwardly from the fender margin in assembly with the fender, the fender shield having upper means at the top margin thereof for engaging said fender to retain the fender shield upper portion against outward movement relative to the fender, intermediate means carried at the intermediate portion of the fender shield at opposite ends thereof for retaining the fender shield against inward movement relative to the fender, and latching means carried by the lower portion of the fender shield to engage said fender to retain the fender shield in closing relation to the wheel access opening, said intermediate means extending radially outwardly beyond the fender shield outer margin and engaging said fender on the outer side thereof adjacent said wheel access opening.

10. In a fender shield assembly, a fender shield having means at the top thereof for engaging the upper portion of the fender shield with a fender, means at an intermediate portion of the fender shield at the opposite ends thereof for retaining an intermediate portion of a fender shield with the fender, and latching means mounted adjacent the lower portion of said fender shield for engaging the fender in assembled relation of the fender shield with the fender, said intermediate means including arm portions extending outwardly from said fender shield for engaging the outer side of the fender to retain the fender shield against inward movement relative to the fender.

11. In combination in a fender and fender shield assembly, a fender having a wheel access opening and a fender shield for closing said opening, the fender shield having upper means at the top margin thereof for engaging said fender to retain the fender shield upper portion against outward movement relative to the fender, intermediate means operatively connected to said fender and said fender shield for retaining an intermediate portion of the fender shield against inward movement relative to the fender, said intermediate retaining means being arranged to limit inward movement of the intermediate portion of the fender shield when the upper means at the top margin of the fender shield is in engagement with the fender, and lower means at the lower portion of the fender shield for engaging the fender and arranged to require flexion of the lower portion of the fender shield relative to said intermediate means for full engagement with said fender to impart to said fender shield a resilient warp.

12. In combination in a fender and fender shield assembly, a fender having a wheel access opening and a fender shield for closing said opening; upper engagement means providing for engagement of the fender shield with the fender at the upper portion of the fender shield, intermediate engagement means providing for engagement of the fender shield with the fender at an intermediate portion of the fender shield, and lower engagement means providing for engagement of the fender shield with the fender at the lower portion of the fender shield; said upper engagement means, intermediate engagement means, and lower engagement means being constructed and arranged and said lower means being offset relative to said upper and intermediate means to require flexing and horizontal displacement of said lower portion of the fender shield relative to the upper portion of the fender shield in movement of the lower portion of the fender shield toward assembled relation with the fender, and said upper and lower engagement means being connected to portions of the fender shield capable of relative flexure and horizontal displacement to accommodate displacement of the lower portion of the fender shield relative to said upper portion of said fender shield.

13. For use in a fender and fender shield assembly, a fender shield upper bracket for attachment to a fender shield and for engagement with the upper margin of a fender opening to retain the fender shield upper portion against outward displacement, a pair of intermediate brackets for attachment to an intermediate portion of the fender shield at opposite ends thereof and for engagement with an intermediate portion of the fender to retain the fender shield against inward displacement, and a latching mechanism for mounting at the lower portion of the fender shield for engaging the fender to retain the fender shield lower portion against outward displacement, the points of engagement between the upper and intermediate brackets and the fender, and between the latching mechanism and the fender being horizontally offset to require a warping of the fender shield in full assembly with the fender.

14. In combination in a fender and fender shield assemly, a fender having a wheel access opening and a fender shield for closing said opening, the fender shield having upper means at the top thereof for engaging said fender to retain the fender shield upper portion against outward movement relative to the fender, means operatively connected to the fender and fender shield for retaining the fender shield intermediate portion against inward movement relative to the fender, said intermediate retaining means being arranged to limit inward movement of the intermediate portion of the fender shield when the upper means is in engagement with the fender, and lower means at the lower portion of the fender shield for engaging the fender and arranged to require flexion of the lower portion of the fender shield about said intermediate means for full engagement with the fender to impart to said fender shield a resilient warp, said intermediate means comprising brackets carried by the fender and by the fender shield providing a tongue and slot interengagement therebetween to provide vertical support for the fender shield.

15. In combination in a fender and fender shield assembly, a fender having a wheel access opening and a fender shield for closing said opening, the fender shield having upper means at the top thereof for engaging said fender to retain the fender shield upper portion against outward movement relative to the fender, means for retaining the fender shield intermediate portion against inward movement relative to the fender, said intermediate retaining means being arranged to limit inward movement of the intermediate portion of the fender shield when the upper means is in engagement with the fender, and lower means at the lower portion of the fender shield for engaging the fender and arranged to require flexion of the lower portion of the fender shield about said intermediate means for full engagement with the fender to impart to said fender shield a resilient warp, said intermediate means comprising brackets carried by the fender and by the fender shield providing a tongue and slot interengagement therebetween to provide vertical support for the fender shield, said tongue having a sloping surface for forcing the fender shield upwardly as the fender shield is pivoted inwardly about said upper means.

16. In combination in a fender and fender shield assembly, a fender having a wheel access opening and a fender shield for closing said opening, the fender shield having upper means at the top thereof for engaging the fender to retain the fender shield upper portion against outward movement relative to the fender, intermediate means carried at the intermediate portion of the fender shield at opposite ends thereof for retaining the fender shield against inward movement relative to the fender, and means carried by the lower portion of the fender shield to engage said fender to retain the fender shield in closing relation to the wheel access opening, said intermediate means comprising a bracket carried by the fender and a bracket carried by the fender shield said brackets having tongue and slot interengaging means for providing vertical support for the fender shield in assembly with the fender.

17. In combination in a fender and fender shield assembly, a fender having a wheel access opening and a fender shield for closing said opening, the fender shield having upper means at the top thereof for engaging the fender to retain the fender shield upper portion against outward movement relative to the fender, intermediate means carried at the intermediate portion of the fender shield at opposite ends thereof for retaining the fender shield against inward movement relative to the fender, and means carried by the lower portion of the fender shield to engage said fender to retain the fender shield in closing relation to the wheel access opening, said intermediate means comprising a bracket carried by the fender and a bracket carried by the fender shield, said brackets having tongue and slot interengaging means for providing vertical support for the fender shield in assembly with the fender, said tongue having a sloping surface for forcing the fender shield upwardly as the fender shield is pivoted inwardly about said upper means.

18. For use in a fender and fender shield assembly, a fender shield upper bracket for mounting at the top of a fender shield for retaining the fender shield upper portion against outward movement relative to the fender, an intermediate bracket for attachment to an intermediate portion of the fender shield, a cooperating intermediate bracket for attachment to the fender adjacent the intermediate portion of the wheel access opening of the fender, and latching means to be carried by the lower portion against outward movement relative to the fender, said intermediate fender and fender shield brackets providing tongue and slot interengagement and being constructed for mounting on the fender and fender shield to provide vertical support for the fender shield in assembly with the fender.

19. In combination in a fender and fender shield assembly, a fender having a smooth turned margin defining a wheel access opening, a fender shield for mounting flush with said fender margin but spaced therefrom and within said wheel access opening, upper means on the fender and on the fender shield for exerting a reactive inward thrust on an upper portion of the fender shield, intermediate means on the fender and on the fender shield for exerting a reactive outward thrust on an intermediate portion of the fender shield below said upper portion thereof, and lower means on the fender and on the fender shield for exerting an inward thrust on the fender shield on a lower portion of the fender shield below said intermediate portion thereof.

20. In a fender shield, a retaining assembly for retaining the lower portion of the fender shield in assembly with a fender comprising laterally extending arms mounted at the lower corners of said fender shield for lateral reciprocation, and an elongated flexible element extending between said arms for limiting outward projection of the arms, and for effecting retraction of the arms by bowing of the flexible element, said arms each having a laterally extending portion and an inturned angularly related terminal portion forming a V-configuration with said laterally extending portion.

References Cited in the file of this patent

UNITED STATES PATENTS

| | | |
|---|---|---|
| 601,310 | Thomas | Mar. 29, 1898 |
| 1,015,907 | Ryder | Jan. 30, 1912 |
| 2,202,904 | Fergueson | June 4, 1940 |
| 2,222,619 | Jandus | Nov. 26, 1940 |
| 2,239,373 | Schatzman | Apr. 22, 1941 |
| 2,288,725 | Lyon | July 7, 1942 |
| 2,572,774 | Smith | Oct. 23, 1951 |
| 2,609,218 | Van Antwerp | Sept. 2, 1952 |
| 2,620,204 | Hammond | Dec. 2, 1952 |